(12) United States Patent
Yamaguchi et al.

(10) Patent No.: US 9,556,738 B2
(45) Date of Patent: Jan. 31, 2017

(54) TURBINE ROTOR FOR SUPERCHARGER AND MANUFACTURING METHOD THEREOF

(71) Applicant: MITSUBISHI HEAVY INDUSTRIES, LTD., Tokyo (JP)

(72) Inventors: Hideki Yamaguchi, Tokyo (JP); Takashi Arai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 336 days.

(21) Appl. No.: 14/380,952

(22) PCT Filed: Feb. 26, 2013

(86) PCT No.: PCT/JP2013/054990
§ 371 (c)(1),
(2) Date: Aug. 26, 2014

(87) PCT Pub. No.: WO2013/129410
PCT Pub. Date: Sep. 6, 2013

(65) Prior Publication Data
US 2015/0037159 A1   Feb. 5, 2015

(30) Foreign Application Priority Data

Feb. 29, 2012 (JP) ................................. 2012-044142

(51) Int. Cl.
*F01D 5/08* (2006.01)
*B23K 1/00* (2006.01)
(Continued)

(52) U.S. Cl.
CPC . *F01D 5/08* (2013.01); *B23K 1/00* (2013.01); *B23K 1/0008* (2013.01);
(Continued)

(58) Field of Classification Search
CPC ............ F01D 5/08; F01D 5/025; F01D 5/063; B23K 1/0008; F05D 2230/237; F05D 2260/30
(Continued)

(56) References Cited

U.S. PATENT DOCUMENTS 6,291,086 B1 * 9/2001 Nguyen-Dinh ........ B23K 20/12
148/530
7,287,960 B2 * 10/2007 Decker ................... F01D 5/025
416/213 R
(Continued)

FOREIGN PATENT DOCUMENTS

| CN | 101517199 A | 8/2009 |
| CN | 102046960 A | 5/2011 |

(Continued)

OTHER PUBLICATIONS

International Preliminary Report on Patentability and Written Opinion of the International Searching Authority (forms PCT/IB/338, PCT/IB/373, PCT/ISA/237 and PCT/IB/326), issued Sep. 12, 2014, for International Application No. PCT/JP2013/054990, with an English translation of the Written Opinion.
(Continued)

*Primary Examiner* — Michael R Reid
(74) *Attorney, Agent, or Firm* — Birch, Stewart, Kolasch & Birch, LLP (57) ABSTRACT

A turbine rotor for a supercharger includes a TiAl turbine wheel and a carbon steel shaft joined to each other via an Ni brazing filler metal at a brazed part distanced from a back face of the turbine wheel so that a turbine wheel outer diameter ratio calculated by "a distance from the back face of the turbine wheel to the brazed part"/"an outer diameter of the turbine wheel" is within a range of from 7 to 10%.

4 Claims, 4 Drawing Sheets

(51) Int. Cl.
*B23K 1/19* (2006.01)
*C22C 14/00* (2006.01)
*C22C 38/00* (2006.01)
*C22C 38/38* (2006.01)
*F01D 5/02* (2006.01)
*C22C 19/03* (2006.01)
*C22C 38/04* (2006.01)
*C22C 38/18* (2006.01)
*B23K 35/30* (2006.01)
*B23K 35/00* (2006.01)
*B23K 35/26* (2006.01)
*B23K 35/02* (2006.01)
*B22F 3/15* (2006.01)

(52) U.S. Cl.
CPC .............. *B23K 1/0018* (2013.01); *B23K 1/19* (2013.01); *B23K 35/002* (2013.01); *B23K 35/004* (2013.01); *B23K 35/0222* (2013.01); *B23K 35/26* (2013.01); *B23K 35/3033* (2013.01); *C22C 14/00* (2013.01); *C22C 19/03* (2013.01); *C22C 38/00* (2013.01); *C22C 38/04* (2013.01); *C22C 38/18* (2013.01); *C22C 38/38* (2013.01); *F01D 5/026* (2013.01); *B22F 3/15* (2013.01); *F05D 2220/40* (2013.01); *F05D 2230/237* (2013.01); *F05D 2300/171* (2013.01); *F05D 2300/174* (2013.01)

(58) Field of Classification Search
USPC .............. 123/217, 218; 228/262.71, 262.72; 416/213 R, 916, 244 R, 213 A, 244 A
See application file for complete search history.

(56) References Cited

U.S. PATENT DOCUMENTS

| | | | |
|---|---|---|---|
| 2006/0239841 | A1 | 10/2006 | Panek |
| 2007/0199977 | A1 | 8/2007 | Pollard et al. |
| 2008/0199313 | A1* | 8/2008 | Nitta ..................... F01D 5/026 415/216.1 |

FOREIGN PATENT DOCUMENTS

| | | |
|---|---|---|
| EP | 0 837 221 A2 | 4/1998 |
| JP | 63-31226 U | 2/1988 |
| JP | 10-118764 A | 5/1998 |
| JP | 10-193087 A | 7/1998 |
| JP | 11-320132 A | 11/1999 |
| JP | 2000-202683 A | 7/2000 |
| JP | 2004-90130 A | 3/2004 |
| JP | 2007-229792 A | 9/2007 |
| JP | 2009-203807 A | 9/2009 |

OTHER PUBLICATIONS

International Search Report and Written Opinion of the International Searching Authority (forms PCT/ISA/210, PCT/ISA/220 and PCT/ISA/237), issued May 14, 2013 for International Application No. PCT/JP2013/054990, with translation of the International Search Report.

Extended European Search Report effective Nov. 23, 2015 issued in the corresponding European Application No. 13755039.8.

Office Action effective Dec. 30, 2015 issued in the corresponding Chinese Application No. 2013800111582 with an English Translation.

Japanese Decision to Grant a Patent, dated Sep. 9, 2016, for Japanese Application No. 2012-044142 is provided, as well as an English translation.

* cited by examiner

TURBINE ROTOR FOR SUPERCHARGER AND MANUFACTURING METHOD THEREOF

TECHNICAL FIELD

This invention relates to a turbine rotor for a supercharger. More specifically, it relates to a turbine rotor for a supercharger including a TiAl turbine wheel and a steel shaft joined to each other by Ni brazing, and a manufacturing method thereof.

BACKGROUND

A turbocharger for an automobile has been downsized for the purpose of improving fuel economy. Also, the exhaust gas temperature has been increased for the purpose of improving performance.

In response to the need for reduced size and improved performance, there is proposed a turbine rotor including a TiAl turbine wheel having high thermal resistance and a steel shaft joined to each other by Ni brazing. For instance, Patent Document 1 (JP2000-202683), Patent Document 2 (JPH10-193087), Patent Document 3 (JPH10-118764) etc are known.

Patent Document 1 discloses a structure in which a turbine wheel of TiAl intermetallic-based alloy and a carbon steel shaft are joined to each other via an intermediate material. The turbine wheel is joined to the intermediate material so that the projection-like joint portion of the turbine wheel is fit into the recess-like joint portion of the intermediate material and a brazing filler metal is inserted therein.

Patent Document 2 also discloses a structure in which a TiAl turbine wheel and a structural or martensite heat-resistant steel rotor shaft are joined to each other by inserting a brazing filler metal (silver brazing, nickel brazing, or copper brazing) between a projection of the TiAl turbine wheel and a recess of the shaft so as to fit the projection into the recess. Similarly, Patent Document 3 discloses a structure in which a TiAl turbine wheel and a structural or martensite heat-resistant steel rotor shaft are joined to each other via a brazing filler metal.

CITATION LIST

Patent Literature

Patent Document 1: JP2000-202683
Patent Document 2: JPH10-193087
Patent Document 3: JPH10-118764

SUMMARY

Technical Problem

Figure 6:
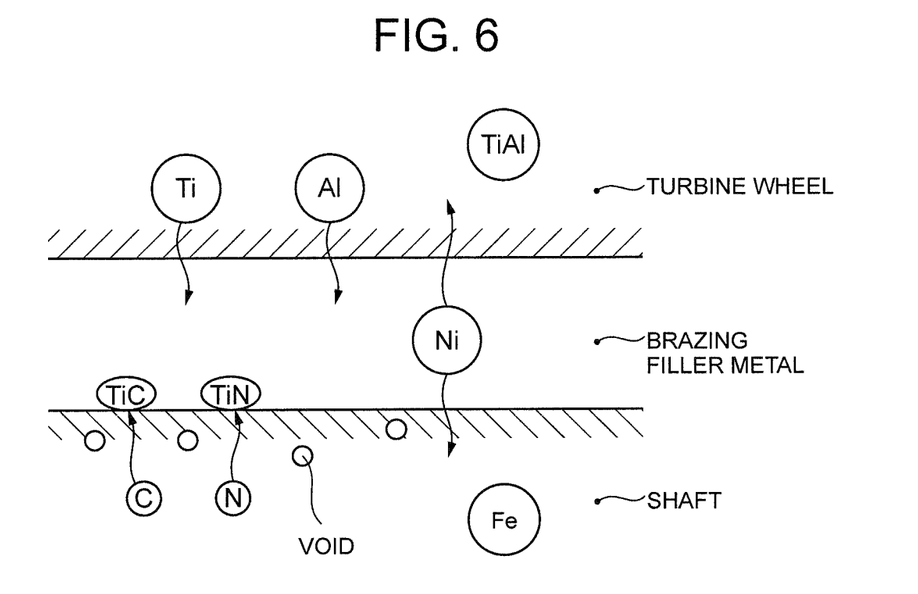
FIG. 6 is an explanatory diagram of mutual diffusion among a TiAl turbine wheel, an Ni brazing filler metal, and a carbon steel shaft.

As described above, in accordance with the increase in exhaust gas temperature, the gasoline engine of a passenger vehicle may have an exhaust gas temperature that reaches approximately 1,000° C. Exposing a TiAl turbine rotor to exhaust gas having such high temperature leads to progress of diffusion between the TiAl turbine wheel and the Ni brazing filler metal, or between the Ni brazing filler metal and the carbon steel shaft as shown in FIG. 6.

Diffusion herein is referred to as a phenomena in which the Ti component and the Al component of a turbine wheel transfer to a brazing filler metal, the Ni component of the Ni brazing filler metal transfers to a turbine wheel or a shaft, or the C component and the N component of the shaft transfer to the brazing filler metal, so as to average the composition distribution between the materials.

Due to the movement of the C component and the N component of the shaft, the Ti having transferred from the turbine wheel then binds to the boundary part between the Ni brazing filler metal and the carbon steel shaft, thereby producing carbide, nitride or carbonitride such as TiC (titan carbide) and TiN (titan nitride). In the shaft, voids are generated in the place from which the C component and the N component have transferred and moved out.

Such carbide, nitride or carbonitride, as well as the voids produced in the boundary part between the Ni brazing filler metal and the carbon steel shaft, considerably reduce the brazing strength, which may lead to breakage in some occasions. This diffusion becomes more remarkable with the increase in the temperature. Thus, with the increasing temperature of the exhaust gas, the problem of decrease in the strength of the brazed part has become serious, raising demands for a countermeasure thereto.

Patent Documents 1 to 3 disclose technologies for joining a TiAl turbine wheel to a carbon steel shaft via a brazing filler metal. However, they do not disclose preventing generation of Ti carbide, nitride, carbonitride or voids in the boundary part between the brazing filler metal and the carbon steel shaft to prevent decrease in the joint strength of the brazed part.

Meanwhile, for an automobile turbocharger, downsizing is an essential component of the technology in view of the need for its mountability to a vehicle. If the brazing position is to be distanced from the turbine wheel for the purpose of preventing the decrease in the strength of the brazed part that could be caused by the thermal effect of the heat transferred to the brazed part from the turbine wheel or the thermal effect due to the exhaust gas leaking from the inlet side of the turbine wheel and flowing into the brazed part, it is necessary to increase the shaft length of the turbine rotor or the diameter of the turbine wheel, which leads to increased size of the turbocharger. Accordingly, downsizing contradicts preventing the decrease in the strength of the brazed part caused by thermal effect. Thus, how to approach the above issues is a significant problem.

In view of the problems of the prior art, an object of the present invention is, for a turbine rotor where a TiAl turbine wheel and a carbon steel shaft are joined to each other via an Ni brazing filler metal, to dispose the brazing position distanced from the back face of the turbine wheel by a distance of the optimal range so as to retain the reduced size of a turbocharger while preventing the decrease in the strength of the brazed part caused by the exhaust gas temperature.

Solution to Problem

In order to solve the above problem, a turbine rotor for a supercharger includes a TiAl turbine wheel and a carbon steel shaft joined to each other via an Ni brazing filler metal at a brazed part distanced from a back face of the turbine wheel so that a turbine-wheel outer diameter ratio calculated by "a distance from the back face of the turbine wheel to the brazed part"/"an outer diameter of the turbine wheel" is within a range of from 7 to 10%.

According to this invention, the distance between the back face of the turbine wheel and the brazed part is set so that the turbine-wheel outer diameter ratio, which is calculated by the expression "a distance from the back face of the turbine wheel to the brazed part"/"an outer diameter of the turbine wheel", is in the range of from 7 to 10%. As a result, it is possible to prevent decrease in the strength of the brazed part caused by the exhaust gas temperature while retaining the reduced size of the supercharger without increasing the length of the rotor shaft and changing the position of the bearings of the rotor shaft.

Figure 4:
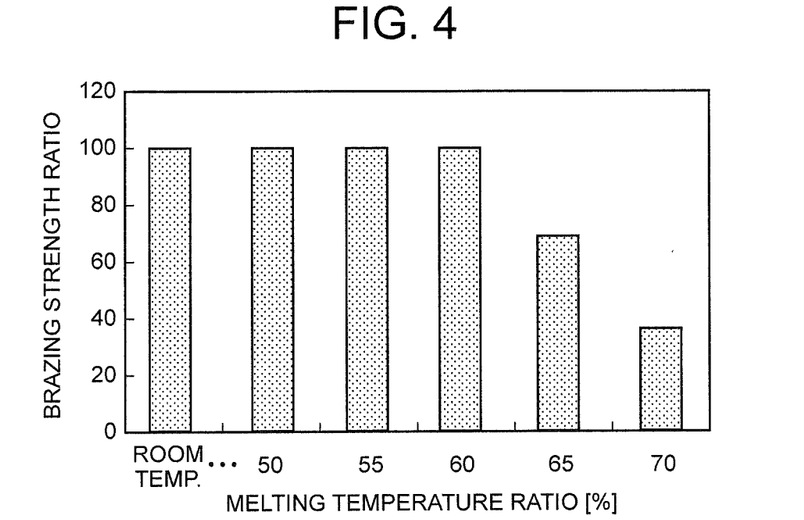
FIG. 4 is a characteristic diagram of strength of a brazed part after high temperature is maintained for a long period of time.

More specifically, as a result of a test that was conducted on the decrease in the strength of the brazed part upon the turbine wheel being exposed to exhaust gas of high temperature for a long period of time, it was found that, as illustrated in FIG. 4, the joint strength of the brazed part remarkably decreases if exposed for a long period of time (800 hours) under a temperature state where the temperature of the joint part is at least approximately 60% of the melting point of the brazing filler metal (the test was performed with a test piece where a TiAl turbine wheel and a carbon steel rotor shaft were joined via an Ni brazing filler metal).

Figure 3:
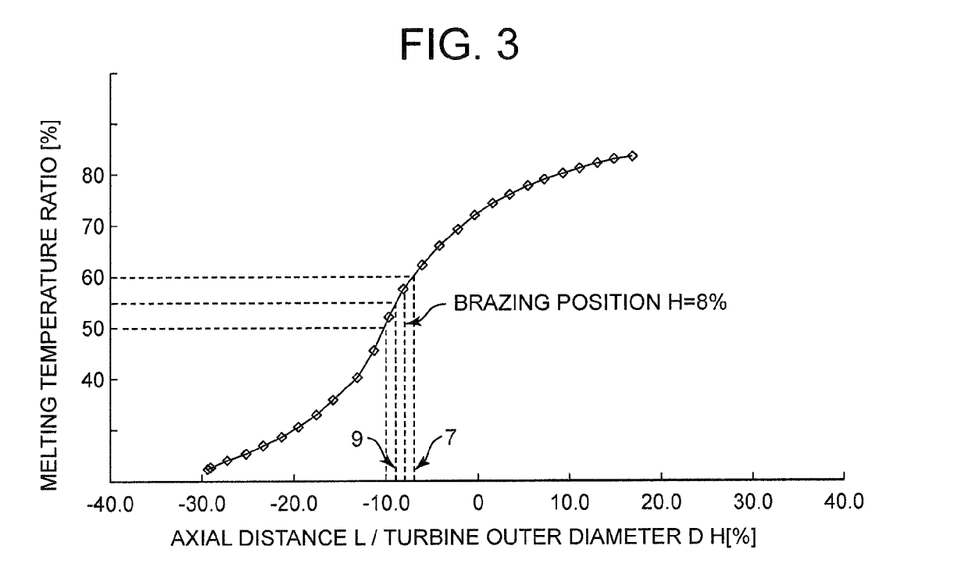
FIG. 3 is a characteristic diagram of a relationship between the ratio of the axial distance to the outer diameter of the turbine and the ratio of the melting point.

Further, FIG. 3 is a characteristic graph of the temperature ratio relative to the axial positions of the shaft, where y-axis is the temperature ratio to the melting point of the brazing filler metal while x-axis is the ratio of the axial distance of the shaft to the outer diameter of the turbine wheel. According to the relationship illustrated in FIG. 3, the temperature decreases as the distance from the turbine wheel to the brazed part increases, thereby preventing the decrease in the joint strength. However, as the rotor shaft becomes longer in accordance with the increased distance from the turbine wheel to the brazed part, there is a problem that it may increase the size of the turbocharger.

Accordingly, in the present invention, the position of the joint part is set in the vicinity of the position just before exceeding the temperature of approximately 60% of the melting point of the brazing filler metal at which decrease in the strength becomes remarkable, i.e., at the position such that the maximum temperature of the position of the brazed part is within the temperature range of from 50 to 60% of the melting point of the Ni brazing filler metal, so that it is possible to prevent the decrease in the strength of the brazed part caused by the exhaust gas temperature while retaining the reduced size of the supercharger without increasing the length of the rotor shaft and changing the position of the bearing.

Furthermore, in view of the above findings, using the characteristic relationship of FIG. 3, the turbine-wheel outer diameter ratio corresponding to the temperature range of from 50 to 60% of the melting point of the Ni brazing filler metal is calculated by the expression "a distance from the back face of the turbine wheel to the brazed part"/"an outer diameter of the turbine wheel". As a result, by setting the turbine-wheel outer diameter ratio within the range of from 7 to 10%, it is possible to prevent the decrease in the strength of the brazed part caused by the exhaust gas temperature while retaining the reduced size of the supercharger, as described above.

Further, it is optimal to set the turbine-wheel outer diameter ratio to substantially 8%, corresponding to the temperature range of from 55 to 60% that is just before exceeding 60% of the melting point of the Ni brazing filler metal.

The temperature of the inlet side of the turbine wheel is substantially constant due to the exhaust gas temperature. Thus, regarding the thermal effect of the heat transfer to the rotational axis center, the transferred heat that reaches the brazed part decreases in accordance with the size of the outer diameter of the turbine wheel if the outer diameter is large. Accordingly, the outer diameter of the turbine wheel is an important element in evaluating the joint strength of the brazed part.

Accordingly, in the present invention, the joint position is set based on not only the distance from the back face of the turbine wheel to the brazed part, but on the turbine-wheel outer diameter ratio, which is calculated as a ratio of such distance to the outer diameter of the turbine wheel, thereby increasing reliability of the joint position to be set.

Further, preferably in the present invention, a back plate may be disposed at a back face side of the turbine wheel along the back face with a gap between the back plate and the back face so as to prevent the exhaust gas that leaks from an inlet toward the back face of the turbine wheel from flowing into the joint part of the Ni brazing filler metal.

As described above, a back plate i.e. a heat shield plate is disposed so as to prevent the leaking flow of the exhaust gas from directly affecting the joint part of brazing. Thus, it is possible to prevent the decrease in the strength of the joint part caused by the leaking exhaust gas flow.

Further, the leaking flow of the exhaust gas that flows into the joint part is suppressed, which increases the accuracy of the position of the brazed part calculated based on the characteristic graph of FIG. 3. This is because the temperature relative to the axial positions for obtaining the characteristic graph of FIG. 3 is obtained by thermal conduction calculation based on the exhaust gas temperature at the inlet side of the turbine wheel and thereby does not include temperature increase due to the leaking exhaust gas.

Further, a manufacturing method of manufacturing a turbine rotor for a supercharger where a TiAl turbine wheel and a carbon steel shaft are joined to each other via an Ni brazing filler metal includes the steps of:

measuring an outer diameter of the turbine wheel;

setting a distance from a back face of the turbine wheel to a brazed part so that a turbine wheel outer diameter ratio calculated by "a distance from the back face of the turbine wheel to the brazed part"/"an outer diameter of the turbine wheel" is in a range of from 7 to 10%; and joining the TiAl turbine wheel and the carbon steel shaft via the Ni brazing filler metal at a position away from the back face by the distance set in the setting step.

According to this invention, the outer diameter D of the turbine wheel is measured, and then using the measured value, a distance L from the back face of the turbine wheel to the brazed part is set so that the turbine-wheel outer diameter ratio H calculated by the expression "a distance L from the back face of the turbine wheel to the brazed part"/"an outer diameter D of the turbine wheel" is within the range of from 7 to 10%. Brazing is performed at the distance L using the Ni brazing filler metal.

Accordingly, based on the position at the distance L, it is possible to set the brazed part at the position such that the bearing span is expanded to the maximum, which makes it possible to prevent shaft vibration, as well as to prevent the supercharger from increasing in size while preventing the decrease in the strength of the brazed part caused by the exhaust gas temperature.

Advantageous Effects

As described above, according to the present invention, in a turbine rotor where a TiAl turbine wheel and a carbon steel shaft are joined to each other via an Ni brazing filler metal, the distance from the back face of the turbine wheel to the brazed part is set so that the turbine-wheel outer diameter ratio is in the range of from 7 to 10%. The outer diameter ratio is calculated by the expression "a distance from the back face of the turbine wheel to the brazed part"/"an outer diameter of the turbine wheel". As a result, it is possible to prevent decrease in the strength of the brazed part while retaining reduced size of the supercharger even in the case where the temperature of the exhaust gas flowing through the turbine wheel reaches approximately 950 to 1,000° C.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
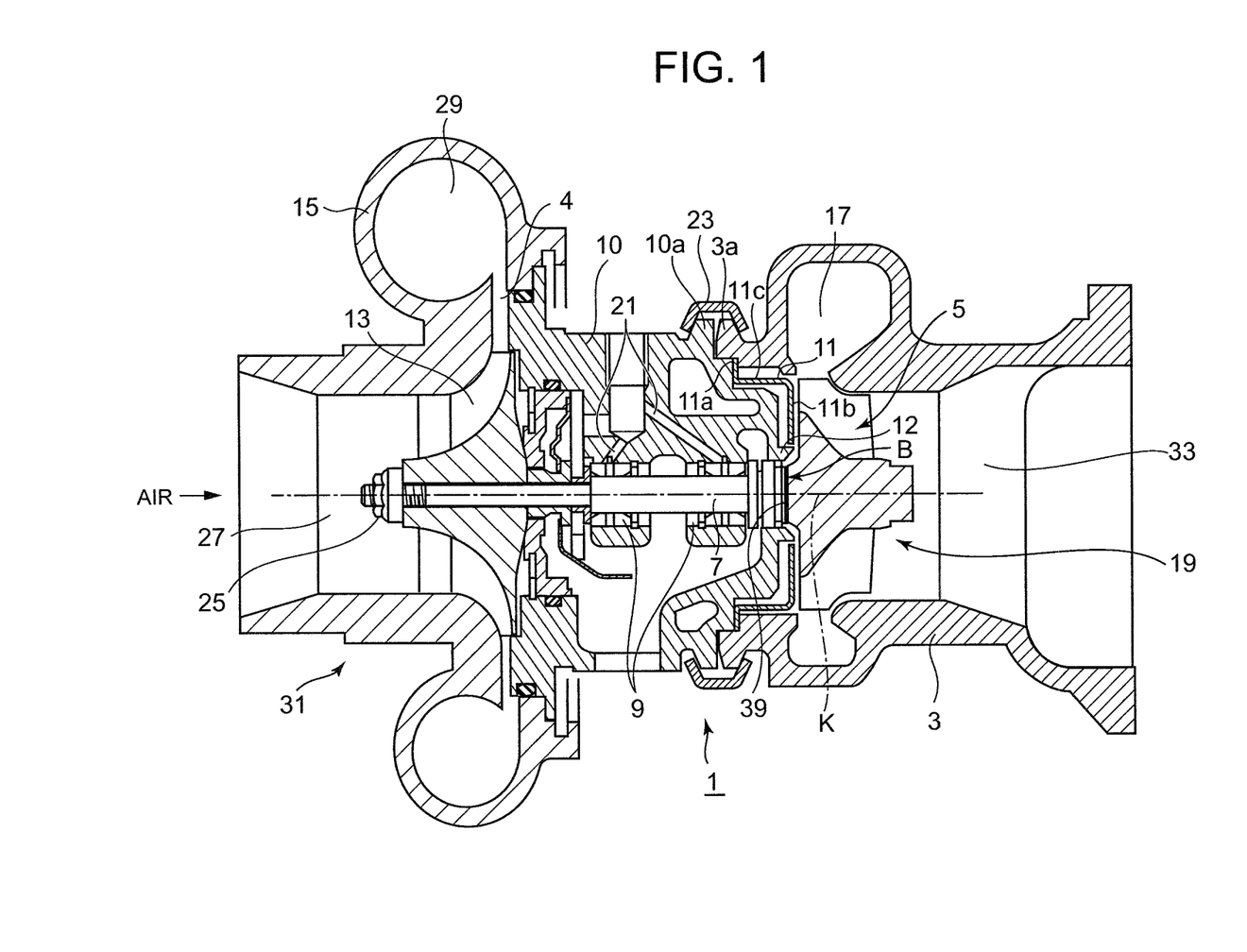
FIG. 1 is a cross-sectional view of a supercharger according to one embodiment of the present invention.

FIG. 1 is a cross-sectional view of a supercharger 1 along its rotational axis center K.

First, the overview of the configuration of the supercharger 1 will be described. The supercharger 1 is for a gasoline engine of a passenger vehicle and includes a turbine housing 3 that houses a turbine wheel 5, a bearing housing 10 that includes a bearing 9 for rotatably supporting a rotor shaft (hereinafter, referred to as shaft) 7, and a compressor housing 15 that houses an impeller 13 of a compressor, arranged adjacent in the direction of the rotational axis center K.

A scroll 17 is formed into a spiral shape on the outer circumferential part of the turbine housing 3. The turbine wheel 5 is disposed on the central part of the spiral shape. The turbine wheel 5 and an end of the shaft 7 are joined to each other via a brazing filler metal at the joint part B to be integrated with each other, thereby forming a turbine rotor 19.

Further, the bearing housing 10 includes a pair of right- and-left bearings 9, 9 that support the shaft 7 rotatably around the rotational axis center K. Lubricant oil is supplied to each of the bearings 9, 9 through lubricant oil passages 21.

The bearing housing 10 and the turbine housing 3 are connected to each other by coupling the protruding flanges 10a, 3a respectively formed on their ends and then fitting a snap ring 23 of an annular shape having a substantially U-shaped cross-section onto the outer circumferences thereof. An outer flange part 11a of the outer circumferential part of a back plate 11 described below is interposed to be held in this connection part, so that the back plate 11 is fixed thereto.

The back plate 11 has a substantially cylindrical shape with a closed bottom, including a bottom part 11b and a cylinder part 11c of a substantially cylindrical shape extending in one direction of the rotational axis center K from the outer circumferential rim of the bottom part. An end portion of the cylindrical part bends at a right angle with respect to the direction of the rotational axis center K so as to form the outer flange part 11a. The outer flange part 11a is interposed between the bearing housing 10 and the turbine housing 3 to be positioned and fixed thereto.

Further, on the other end of the shaft 7, the impeller 13 of the compressor is fixed by an attaching nut 25. The compressor housing 15 includes an air inlet passage 27, an air passage 29 of a spiral shape, and a diffuser, all of which constitute a centrifugal compressor 31.

Upon operation of the turbocharger 1 having the above configuration, the exhaust gas from the engine (not illustrated) enters the scroll 17, and then flows into the turbine blades of the turbine wheel 5 from the scroll 17 through the outer circumferential side of the turbine wheel 5, flowing in the radial direction toward the center. After having performed expansion work on the turbine wheel 5, the exhaust gas flows out in the axial direction to be guided to a gas outlet 33 and discharged outside.

Meanwhile, rotation of the turbine wheel 5 rotates the impeller 13 of the centrifugal compressor 31 via the shaft 7. The air taken in through the air inlet passage 27 of the compressor housing 15 is pressurized by the impeller 13, and is supplied to the engine (not illustrated) through the air passage 29.

Further, as illustrated in FIG. 1, the turbine wheel 5 and the shaft 7 are joined to each other at the joint part B. On the bearing 9 side of the joint part B, a seal flange or a metal seal ring disposed on the shaft 7 is provided so as to prevent the exhaust gas from flowing into the bearing 9 side.

Then, a substantial part of the exhaust gas G that has flown into the scroll 17 inside the turbine housing 3 from the engine then flows in the radial direction from the inlet side of the turbine wheel 5. However, a part of the exhaust gas leaks out and flows toward the back face of the turbine wheel 5. Even in the event of such leakage flow, the flow flowing in the direction of the rotational axis center K is narrowed by the gap formed between the back face of the turbine wheel 5 and the bottom part 11b of the back plate 11, and further, the flow to the joint part B of the shaft 7 is blocked by the narrowing aperture formed by the gap between the back face of the turbine wheel 5 and the end of a cylindrical flange 12 formed on the end of the bearing housing 10.

As a result of preventing the influence of the leaking exhaust gas on the joint part B by the narrowing effect, it is possible to prevent the decrease in the strength caused by thermal effect of the leakage flow of the exhaust gas.

Next, the turbine rotor 19 will be described in reference to FIG. 2.

The turbine rotor 19 includes the turbine wheel 5 and the rotor shaft (shaft) 7 as described above. The turbine wheel 5 and the shaft 7 are joined to each other by brazing. A projection-like joint portion 35 is formed on the rotation center of an end of the turbine wheel 5 while a recess-like joint portion 37 is formed on the shaft 7. The projection-like joint portion 35 and the recess-like joint portion 37 are in a fitting state, and the end face of the turbine wheel 5 and the end face of the shaft 7 are joined to each other via an Ni brazing filler metal 39.

The turbine wheel 5 and the shaft 7 are joined to each other by, for instance, inserting the Ni brazing filler metal 39 between the turbine wheel 5 and the shaft 7, applying pressure in the axial direction to pressurize the Ni brazing filler metal 39, and then covering with a gas of inert atmosphere to heat it by, for instance, high-frequency induction heating. As the Ni brazing filler metal 39, an Ni brazing filler metal of BNi-1, BNi-2, or the like specified in the JIS (Japanese Industrial Standards) is used.

The turbine wheel 5 is composed of a TiAl-based alloy. The TiAl-based alloy contains Ti as the main constituent element and 28 to 35 wt % of Al, and it may further contain an additive element such as Nb, Cr, Mn, Si, W, C or B. In the present embodiment, a TiAl-based alloy containing 31.3 wt % of Ti, 7.0 wt % of Al, 1.3 wt % of Nb and 0.03 wt % of C, and having been subjected to HIP (Hot-Isostatic-Pressing) treatment for a certain period of time at a temperature of at least 1,200° C. after precision casting or sintering for the purpose of eliminating cast defect, is used.

The shaft 7 is composed of a structural steel material. The structural steel material contains Fe as the main constituent element, 0.30 to 0.45 wt % of C, 0.85 to 1.25 wt % of Cr, 0.30 to 1.65 wt % of Mn, at most 0.030 wt % of P and at most 0.030 wt % of S. The structural steel material may further contain an additive element such as Ni or Mo, or N at a level of unavoidable impurities. An avoidable impurity means a substance contained in a slight amount in a structural steel material, because it is present in a raw material or it is unavoidably mixed in during production process. A level of unavoidable impurities means an amount in which an unavoidable impurity has little influence on properties of the structural steel material.

As the structural steel material, a manganese steel, a manganese-chrome steel, a chrome steel, a chrome—molybdenum steel, a nickel—chrome steel, a nickel—chrome—molybdenum steel, or the like may be used.

In this embodiment, as the structural steel material, SCM435, which is a chrome-molybdenum steel containing 0.33 wt % of C and 0.90 wt % of Cr, is used.

Figure 2:
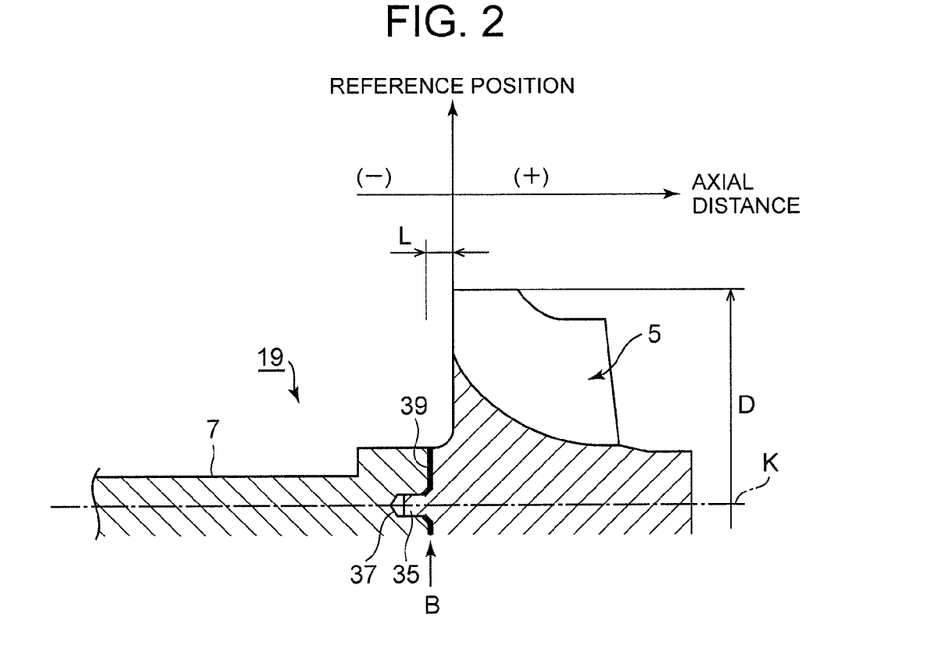
FIG. 2 is an enlarged cross-sectional view of a turbine rotor.

In a state where the turbine rotor 19, in which the TiAl turbine wheel 5 and the carbon steel shaft 7 are joined to each other via the Ni brazing filler metal 39 as described above, is mounted on an engine to operate the supercharger 1 and the exhaust gas temperature reaches approximately 950 to 1,000° C., given that the back face of the turbine wheel 5 shown in FIG. 2 is the reference position (0), the surface temperature T of the shaft 7 at a distance L in the axial direction from the reference position (0) is calculated by thermal conduction calculation, and the turbine-wheel outer diameter ratio H=L/D is calculated based on the outer diameter D of the turbine wheel 5 and the distance L in the axial direction.

Then, based on the temperature T of the shaft 7 at the distance L, the ratio of this temperature T to the melting point of the Ni brazing filler metal is obtained. With this ratio being y-axis and the turbine-wheel outer diameter ratio H=L/D being x-axis, a temperature-distribution characteristic graph is drawn with respect to the axial positions of the turbine rotor 19, as shown in FIG. 3.

According to FIG. 3, the temperature decreases as the axial position shifts away from the reference position (the position of the back face of the turbine wheel 5) toward the minus side (the left side of FIG. 2).

On the other hand, FIG. 4 illustrates the result of a test on the tensile strength for the brazed part after retaining high temperature for a long period of time, for instance, 800 hours in the turbine rotor 19. Y-axis is the brazing strength ratio where the strength at the room temperature (approximately 20° C.) is defined as 100, which is the reference value, and x-axis is the temperature ratio to the melting point of the Ni brazing filler metal.

There can be seen a tendency that the joint strength drops suddenly at the temperature ratio to the melting point of the brazing filler metal (also referred to as "melting point ratio") of 60 to 65%, and then the strength decreases as the temperature increases. In other words, the joint strength of the brazed part remarkably decreases upon being exposed for a long period of time at a temperature whose melting point ratio is 60% or higher.

Accordingly, in order to apply the case, in which the joint strength remarkably decreases when exposed for a long period of time to a temperature of a melting point ratio of 60% or higher, to the temperature-distribution characteristic graph for the turbine rotor 19 of FIG. 3 so as to retain the reduced size of the supercharger 1 while preventing decrease in the strength without increasing the length of the rotor shaft and changing the position of the bearing, it is necessary to set the position of the brazed part in a narrow range that does not exceed the temperature of approximately 60% of the melting point of the brazing filler metal, at which the strength remarkably decreases, i.e., in the temperature range of from 50 to 60% of the melting point of the Ni brazing filler metal.

Upon setting the position of the brazed part in view of the above, using the relationship characteristic of FIG. 3, it was found that the range of from 7 to 10% of the turbine-wheel outer diameter ratio H=L/D corresponding to the temperature range of from 50 to 60% of the melting point of the Ni brazing filler metal is suitable. Further, it is optimal to set the turbine-wheel outer diameter ratio at substantially 8% corresponding to the temperature range of from 55 to 60% that does not exceed 60% of the melting point of the Ni brazing filler metal.

Further, in the present embodiment, the position of the brazed part is set by using not only the distance from the back face of the turbine wheel 5 as a parameter, but the turbine-wheel outer diameter ratio H, which is a ratio of such distance to the outer diameter D of the turbine wheel 5.

If the outer diameter of the turbine wheel is large, the amount of the leaking exhaust gas that reaches the brazed part decreases in accordance with the increased size of the outer diameter, which lowers the risk of exposing the brazed part to high temperature. Thus, the size of the outer diameter of the turbine wheel affects greatly the amount of the leaking exhaust gas that arrives at the brazed part.

Further, the temperature at the inlet side of the turbine wheel is substantially constant due to the exhaust gas temperature. With regard to the thermal effect due to heat transfer toward the rotational axis center, the transferred heat reaching the brazed part decreases in accordance with the increased size of the outer diameter of the turbine wheel if the outer diameter is large. Thus, the outer diameter is an important element in evaluating the joint strength of the brazed part.

Accordingly, the joint position is set using not only the distance from the back face of the turbine wheel to the brazed part, but the turbine-wheel outer diameter ratio H of the turbine wheel, which is a ratio of such distance to the outer diameter of the turbine wheel. Thus, the size of the outer diameter of the turbine wheel is reflected in the setting parameters. As a result, it is possible to set a position of the brazed part with accuracy and reliability.

Next, the method of joining the TiAl turbine wheel 5 and the carbon steel shaft 7 to each other via the Ni brazing filler metal 39 will be described.

The manufacturing method of the turbine rotor 19, more specifically, the setting process for the position of the brazed part will be described.

First, the outer diameter D of the turbine wheel 5 is measured and the distance L from the back face of the turbine wheel 5 to the brazed part is calculated so that the turbine-wheel outer diameter ratio H is in the range of from 7 to 10%, the ratio H being obtained by the expression "a distance L from the back face of the turbine wheel 5 to the brazed part"/"an outer diameter D of the turbine wheel". Then, brazing work is performed on the TiAl turbine wheel and the carbon steel shaft at the position at the calculated distance L.

The outer diameter D of the turbine wheel is measured, and using the measured value, the distance L from the back face of the turbine wheel to the brazed part is calculated so that the turbine-wheel outer diameter ratio H is in the range of from 7 to 10%, the ratio H being obtained by the expression "a distance L from the back face of the turbine wheel to the brazed part"/"an outer diameter D of the turbine wheel", and then brazing work is performed using the Ni brazing filler metal at the position of the distance L of the calculated value. As a result, it is possible to set the bearing span to be expanded to the maximum based on the position at the distance L to prevent axial vibration. Also, it is possible to prevent the brazed position from being distanced from the turbine wheel by an unnecessary distance such that the rotor shaft length and the size of the supercharger 1 would be increased.

In the case in which the joint position of the brazing filler metal is newly set, or in the case in which the position of the brazed part is to be changed to prevent the decrease in the strength of the brazed part for the turbine rotor 19, where joint by the brazing filler metal has been already performed, it is only required to set the brazed part at the position calculated so that the outer diameter ratio H of the turbine wheel is within the range of from 7 to 10%. Thus, such a setting is prevented that the joint position is unnecessarily distanced from the back face of the turbine wheel 5 by changing the bearing span or increasing the length of the shaft 7.

Figure 5A:
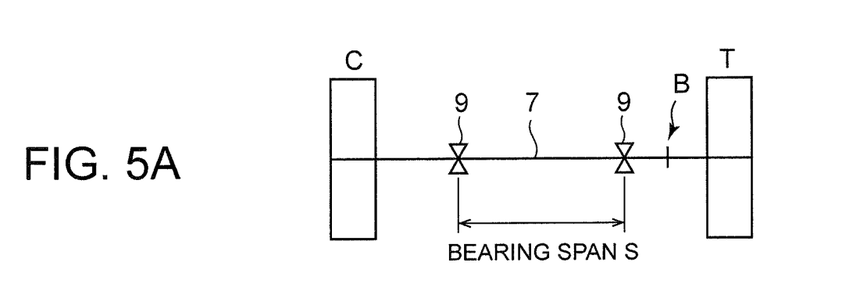
FIGS. 5A to 5C are explanatory diagrams of a relationship of the length of a rotor shaft, the distance between bearings, and the position of the brazed part.
Figure 5B:
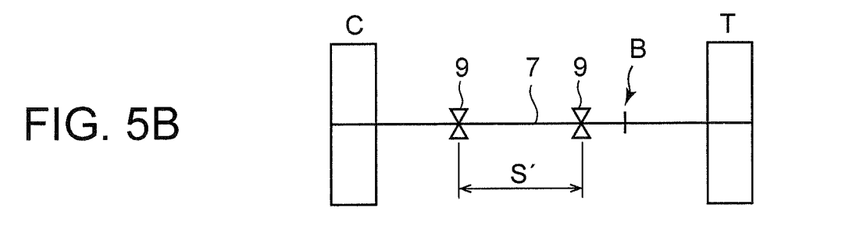

More specifically, FIG. 5B is an illustration of the case where the position of the joint part is unnecessarily distanced from the back face of the turbine wheel 5, while the bearing span S' is set short compared to the conventional bearing span S illustrated in FIG. 5A in order to maintain the reduced size of the supercharger 1. As a result, the length of the shaft 7 for the turbine rotor 19 is not changed, but the bearing span becomes short, which increases the risk of axial vibration of the shaft 7.

Figure 5C:
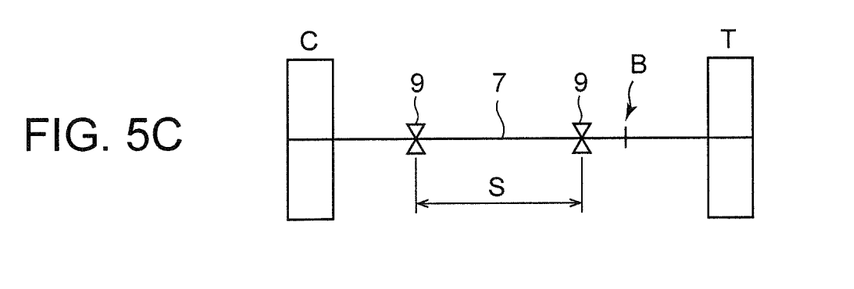

Further, FIG. 5C is an illustration of the case in which the position of the joint part is unnecessarily distanced from the back face of the turbine wheel 5, while the bearing span S needed for preventing the risk of axial vibration of the shaft 7 is set similarly to the conventional case. As a result, the entire length of the shaft 7 for the turbine rotor 19 becomes longer, which increases the size of the supercharger 1.

INDUSTRIAL APPLICABILITY

According to the present invention, for a turbine rotor where a TiAl turbine wheel and a carbon steel shaft are joined to each other via an Ni brazing filler metal, it is possible to retain a reduced size of a turbocharger while preventing decrease in the strength of the brazed part caused by the exhaust gas temperature by disposing the brazed part away from the back face of the turbine wheel by an optimum distance. Thus, the present invention is suitable for use in a turbocharger for an engine of an automobile, a ship, or a plane, or an engine used for a generator, or the like.

The invention claimed is:

1. A turbine rotor for a supercharger comprising:
   a TiAl turbine wheel and a carbon steel shaft joined to each other via an Ni brazing filler metal at a brazed part distanced from a back face of the turbine wheel so that a turbine wheel outer diameter ratio calculated by "a distance from the back face of the turbine wheel to the brazed part" / "an outer diameter of the turbine wheel" is within a range of from 0.07 to 0.1, wherein a maximum temperature at the brazed part is less than 60% of a melting point of the Ni brazing filler metal.

2. The turbine rotor for a supercharger according to claim 1, further comprising:
   a back plate at a back face side of the turbine wheel along the back face with a gap between the back plate and the back face so as to prevent an exhaust gas that leaks from an inlet side toward an outlet side of the turbine wheel from flowing into a joint part of the Ni brazing filler metal.

3. The turbine rotor for a supercharger according to claim 1,
   wherein the brazed part is disposed on a position such that the turbine wheel outer diameter ratio is substantially 0.08.

4. A manufacturing method of manufacturing a turbine rotor for a supercharger where a TiAl turbine wheel and a carbon steel shaft are joined to each other via an Ni brazing filler metal, comprising the steps of:
   measuring an outer diameter of the turbine wheel;
   setting a distance from a back face of the turbine wheel to a brazed part so that a turbine wheel outer diameter ratio calculated by "a distance from the back face of the turbine wheel to the brazed part" / "an outer diameter of the turbine wheel" is in a range of from 7 to 10%; and
   joining the TiAl turbine wheel and the carbon steel shaft via the Ni brazing filler metal at a position away from the back face by the distance set in the setting step.

* * * * *